(12) United States Patent
Singh

(10) Patent No.: US 9,718,417 B2
(45) Date of Patent: Aug. 1, 2017

(54) VEHICLE FLOOR

(71) Applicant: Toyota Motor Engineering & Manufacturing North America, Inc., Erlanger, KY (US)

(72) Inventor: Dilpreet Singh, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 31 days.

(21) Appl. No.: 14/838,681

(22) Filed: Aug. 28, 2015

(65) Prior Publication Data
US 2017/0057431 A1    Mar. 2, 2017

(51) Int. Cl.
*B60R 13/00* (2006.01)
*B60R 13/08* (2006.01)
*B62D 25/20* (2006.01)
*B60N 3/06* (2006.01)
*B60K 26/02* (2006.01)

(52) U.S. Cl.
CPC .......... *B60R 13/0815* (2013.01); *B60K 26/02* (2013.01); *B60N 3/06* (2013.01); *B62D 25/20* (2013.01); *B60Y 2300/43* (2013.01)

(58) Field of Classification Search
CPC ...... B60R 13/0815; B60N 3/06; B60K 26/02; B62D 25/20

USPC .................................. 296/193.07, 75, 39.3
See application file for complete search history.

(56) References Cited

U.S. PATENT DOCUMENTS

| 6,695,374 | B1 * | 2/2004 | Gebreselassie | ....... B60R 13/083 180/90 |
| 7,080,712 | B2 * | 7/2006 | Tsuiki | ................... B60R 13/083 181/204 |
| 7,401,837 | B2 |  7/2008 | MacNeil | |
| 9,022,451 | B2 * | 5/2015 | Ikeno | ..................... B60R 21/04 296/75 |

FOREIGN PATENT DOCUMENTS

DE        20201110802 U1    12/2011

* cited by examiner

*Primary Examiner* — Joseph D Pape
(74) *Attorney, Agent, or Firm* — Christopher G. Darrow; Darrow Mustafa PC

(57) ABSTRACT

A vehicle includes a pedal and a vehicle floor. The vehicle floor has a driver's side footwell area over which the pedal is positioned and a driver's seat area, and includes a rigid floor structure and a floor covering for the floor structure. The floor covering has a heel point for the pedal at the driver's side footwell area, and includes a sound attenuating silencer overlying the floor structure and carpeting overlying the silencer. The silencer's top surface slopes upward in the driver's side footwell area from the heel point to the driver's seat area.

19 Claims, 3 Drawing Sheets

VEHICLE FLOOR

TECHNICAL FIELD

The embodiments disclosed herein generally relate to vehicles and, more particularly, to vehicle floors.

BACKGROUND

The body of a typical vehicle has a floor with a rigid floor structure. In these vehicles, the passenger compartment is usually defined in part by a floor covering for the floor structure. This floor covering may include, for instance, a sound attenuating silencer overlying the floor structure and carpeting overlying the silencer. Generally speaking, the performance of the silencer in attenuating sound is a product of, among other things, its thickness.

SUMMARY

Disclosed herein are embodiments of vehicles with floor coverings. In one aspect, a vehicle includes a pedal and a vehicle floor. The vehicle floor has a driver's side footwell area over which the pedal is positioned and a driver's seat area, and includes a rigid floor structure and a floor covering for the floor structure. The floor covering has a heel point for the pedal at the driver's side footwell area, and includes a sound attenuating silencer overlying the floor structure and carpeting overlying the silencer. The silencer's top surface slopes upward in the driver's side footwell area from the heel point to the driver's seat area.

In another aspect, a vehicle includes a pedal and a vehicle floor. The vehicle floor has a driver's side footwell area over which the pedal is positioned and a driver's seat area, and includes a rigid floor structure and a floor covering for the floor structure. The floor covering has a heel point for the pedal at the driver's side footwell area, and includes a sound attenuating silencer overlying the floor structure and carpeting overlying the silencer. The silencer increases in cross sectional thickness in the driver's side footwell area from the heel point to the driver's seat area.

In yet another aspect, a vehicle includes a pedal and a vehicle floor. The vehicle floor has a driver's side footwell area over which the pedal is positioned and a driver's seat area, and includes a rigid floor structure and a floor covering for the floor structure. The floor covering has a heel point for the pedal at the driver's side footwell area, and includes a compressible but uncompressed sound attenuating silencer resting on the floor structure and carpeting resting on the silencer. The silencer's top surface progressively slopes upward at an approximately 1.3 degree angle in the driver's side footwell area from the heel point to the driver's seat area, with the silencer increasing in cross sectional thickness in the driver's side footwell area from the heel point to the driver's seat area as a product of its top surface sloping upward in the driver's side footwell area from the heel point to the driver's seat area.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a floor covering whose silencer has increased performance in attenuating sound compared to one in an otherwise similar vehicle.

Figure 1:
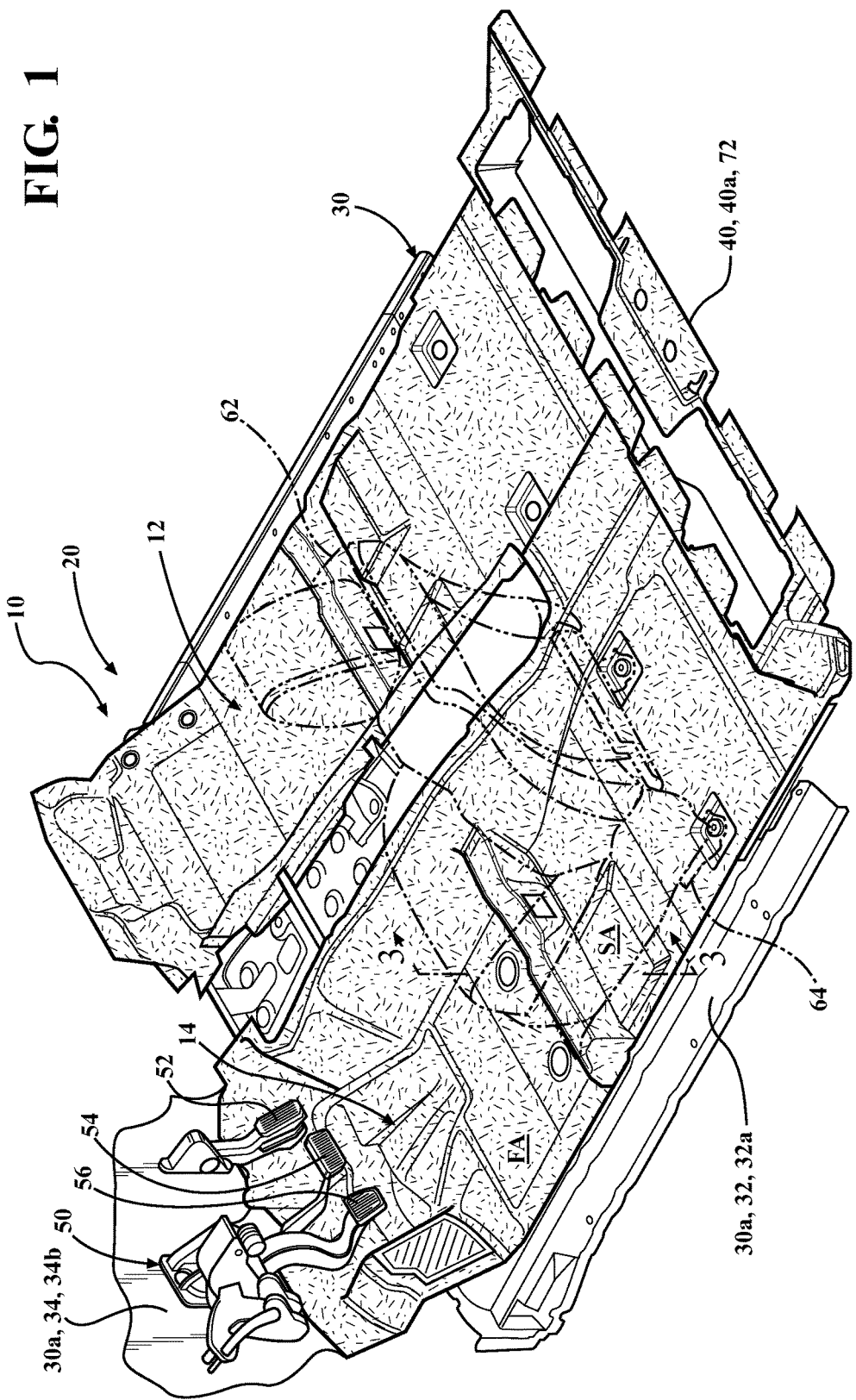
FIG. 1 is an assembly view of a part of a vehicle that has a pedal assembly and a floor, showing a floor structure and a floor covering for the floor structure, with carpeting of the floor covering being visible.

A part of a representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10, of which a part is shown in FIG. 1, has a number of inner compartments, including a passenger compartment 12 with a recessed footwell 14 for accommodating the feet and outstretched legs of a driver of the vehicle 10.

The vehicle 10 has a body that forms the exterior of the vehicle 10 and defines the passenger compartment 12 and other interior compartments. For the part of the vehicle 10 shown, the body has a floor 20. For other parts of the vehicle 10, it will be understood that the body may further have upright sides with doors, a front end, a rear end, a roof and a hood, among other things.

The body includes a rigid body structure 30 constructed from, among other things, interconnected frame members 32 and body panels 34, as well as coverings 40 overlying the inside of the body structure 30. The body structure 30 encloses the passenger compartment 12 and other interior compartments, and for one, some or all of the inner compartments enclosed by the body structure 30, the coverings 40 overly otherwise exposed portions of the inside of the body structure 30 enclosing those inner compartments. The coverings 40 may be cosmetic or functional, or both, and may be, or include, paneling, trim or upholstery, or any combination of these. In general, for a given inner compartment of the vehicle 10, the coverings 40, together with exposed portions of the inside of the body structure 30, if any, define the inner compartment, in whole or in part.

Figure 2:
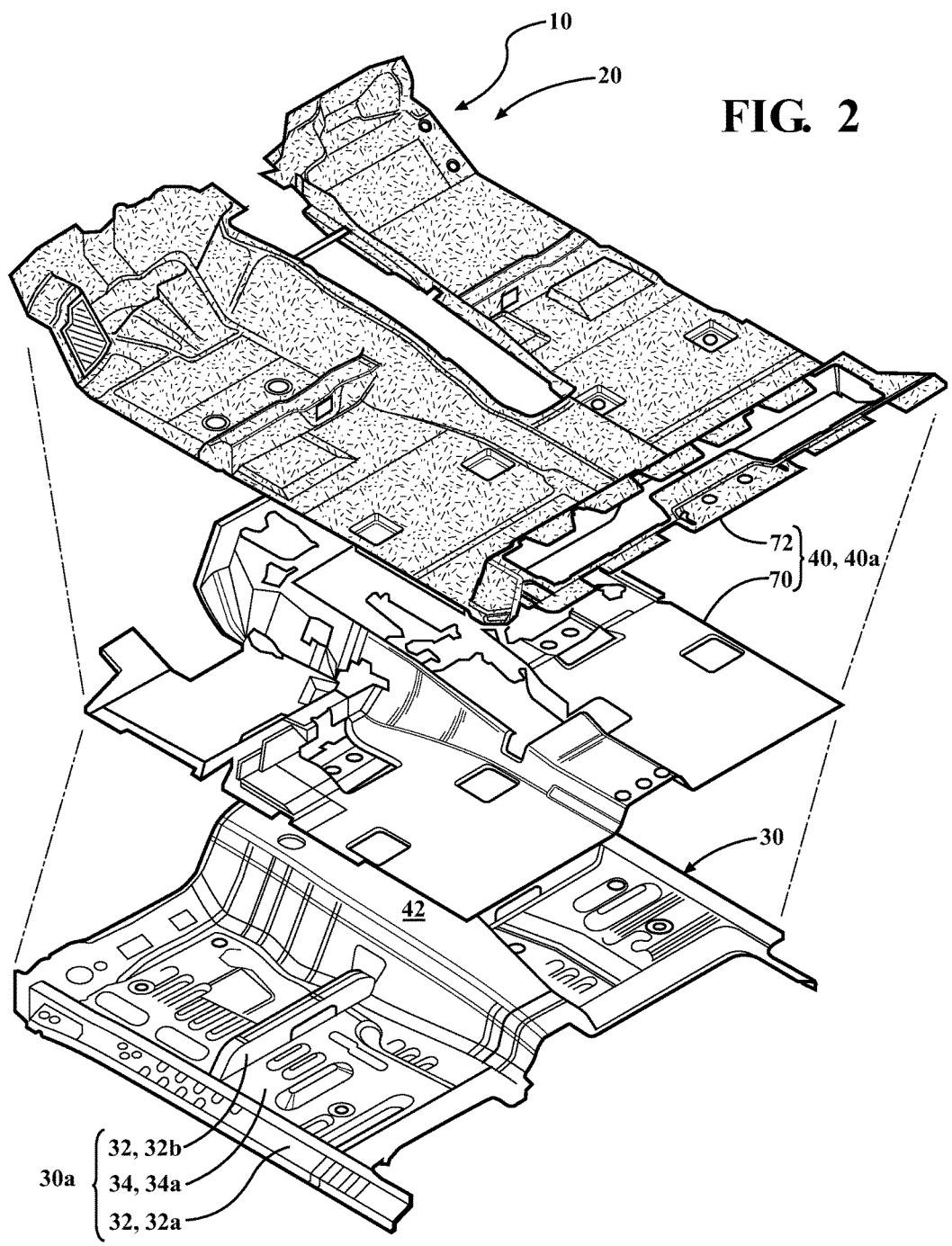
FIG. 2 is an exploded view of the floor of the part of the vehicle shown in FIG. 1, with a silencer of the floor covering additionally being visible.

With additional reference to FIG. 2, for the part of the vehicle 10 shown, the frame members 32 of the body structure 30 include a pair of spaced longitudinally extending side rails 32a and one or more transversely extending cross members 32b (one visible, with the other being a mirror image), and the body panels 34 of the body structure 30 include a horizontally disposed floor pan 34a with a raised, longitudinally extending transmission tunnel 42 and an upright firewall 34b separating the passenger compartment 12 from an engine compartment or other interior compartment defined by the body forward of the passenger compartment 12.

For the floor 20 of the body, the pair of spaced longitudinally extending side rails 32a, the transversely extending cross members 32b and the floor pan 34a collectively form a floor structure 30a, the inside of which encloses, in part, the passenger compartment 12 of the vehicle 10. In the floor structure 30a, the floor pan 34a is connected between the pair of spaced longitudinally extending side rails 32a, and the transversely extending cross members 32b are each connected to the floor pan 34a and between its transmission tunnel 42 and a respective one of the pair of spaced longitudinally extending side rails 32a. The firewall 34b is connected to the front of the floor pan 34a, with portions of the firewall 34b bordering the front of the floor pan 34a additionally forming the floor structure 30a, and with the front of the floor pan 34a and the firewall 34b enclosing, in part, the footwell 14 of the passenger compartment 12.

The floor 20 of the body includes a floor covering 40a for the floor structure 30a. The floor covering 40a overlies otherwise exposed portions of the inside of the floor structure 30a and defines, together with exposed portions of the inside of the floor structure 30a, if any, the passenger compartment 12, in whole or in part. For the part of the vehicle 10 shown, the passenger compartment 12 is largely defined by the floor covering 40a, although for other parts of the vehicle 10, it will be understood that the passenger compartment 12 may further be defined by other coverings 40 and window panels, for instance, together with exposed portions of the inside of the body structure 30, if any.

In the passenger compartment 12, the vehicle 10 includes, among other things, a pedal assembly 50. The pedal assembly 50 includes an accelerator pedal 52, a brake pedal 54 and an optional clutch pedal 56, each of which is pivotally connected to the firewall 34b for manual depression from a rearward release position to one or more forward actuation positions and for automatic return movement to the release position, and positioned in suspension in the footwell 14 over a driver's side footwell area FA of the floor 20.

The vehicle 10 further includes seats housed in its passenger compartment 12, which are represented by a driver's seat 62. Although these seats are represented by the driver's seat 62, it will be understood that other seats may be housed in the passenger compartment 12, such as a passenger seat and one or more rear seats. The driver's seat 62 includes a mounting bracket 64 mounted to the floor structure 30a at a driver's seat area SA of the floor 20 rear of, but bordering, the driver's side footwell area FA. The mounting bracket 64 supports the remainder of the driver's seat 62 in position in the passenger compartment 12, rear of the footwell 14, over the driver's seat area SA.

As shown particularly with reference to FIG. 2, the floor covering 40a for the floor structure 30a includes a sound attenuating silencer 70 overlying the floor structure 30a and carpeting 72 overlying the silencer 70. Although the floor covering 40a could include additional interleaved components, as shown, the silencer 70 rests in contact on the floor structure 30a, and the carpeting 72 rests in contact on the silencer 70. More specifically, with the silencer 70 defining a bottom surface and a top surface, and the carpeting 72 similarly defining a bottom surface and a top surface, the bottom surface of the silencer 70 rests in contact on the floor structure 30a, and the bottom surface of the carpeting 72 rests in contact on the top surface of the silencer 70, with the top surface of the carpeting 72 being that which largely defines the passenger compartment 12 for the part of the vehicle 10 shown.

The silencer 70 is generally configured to absorb, deflect, or otherwise attenuate the transmission of sound waves from the outside of the vehicle 10 to its passenger compartment 12 via the floor structure 30a and other portions of the body structure 30 which it overlies, such as the upper portions of the firewall 34b. The silencer 70 may be particularly configured to attenuate the transmission of sound waves representing noise, vibration and harshness (NVH), for example. The silencer 70 may be composed of any suitable material or combination of materials. The material of the silencer 70 may be, or include, recycled cotton or polyethylene terephthalate (PET) fibers, together with any suitable binder, for example.

As a product of its material, the silencer 70 is manually compressible either by hand, for instance during the assembly of the vehicle 10, or by the pressure of a resting foot F of a driver of the vehicle 10, for instance during the operation of the vehicle 10. In these and other cases of manual compression, the silencer 70 may be generally resilient and capable of substantially returning to an uncompressed condition. In this description, the discussion of the features of the silencer 70 assumes an uncompressed condition.

The carpeting 72 is generally configured to provide a durable but attractive outer layer to the floor covering 40a. The carpeting 72 may but need not contribute to the attenuation of the transmission of sound waves by the silencer 70. The carpeting 72 may be any automotive grade carpeting 72 composed of any suitable material or combination of materials.

As generally shown, the floor structure 30a has many surface features and, as a result, a complex surface geometry, both as a product of the individual surfaces of the components of the floor structure 30a and as a product of their interconnection with one another to form the floor structure 30a. To accommodate the complex surface geometry of the floor structure 30a, both the silencer 70 and the carpeting 72 are shaped to correspond to the shape of the floor structure 30a. More specifically, where the silencer 70 rests in contact on the floor structure 30a, and the carpeting 72 rests in contact on the silencer 70, the bottom surface of the silencer 70 is shaped to match the shape of the floor structure 30a, which is generally maintained at the top surface of the silencer 70, and the bottom surface of the carpeting 72 is shaped to match the shape of the top surface of the silencer 70. The silencer 70 may, for example, be vacuum formed in a mold that imparts a shape to its material that corresponds to the floor structure 30a, while the carpeting 72 may, for example, be cut into a blank and formed in a heated mold to take a shape corresponding to the floor structure 30a.

Generally speaking, regardless of how the performance of the silencer 70 in attenuating sound is evaluated, its performance is a product of, among other things, its thickness, with increasing thickness usually resulting in increasing performance in attenuating sound. The complex combination of packaging constraints resulting from design or regulatory criteria, or both, however, prevents indiscriminate increases in the thickness of the silencer 70.

Figure 3:
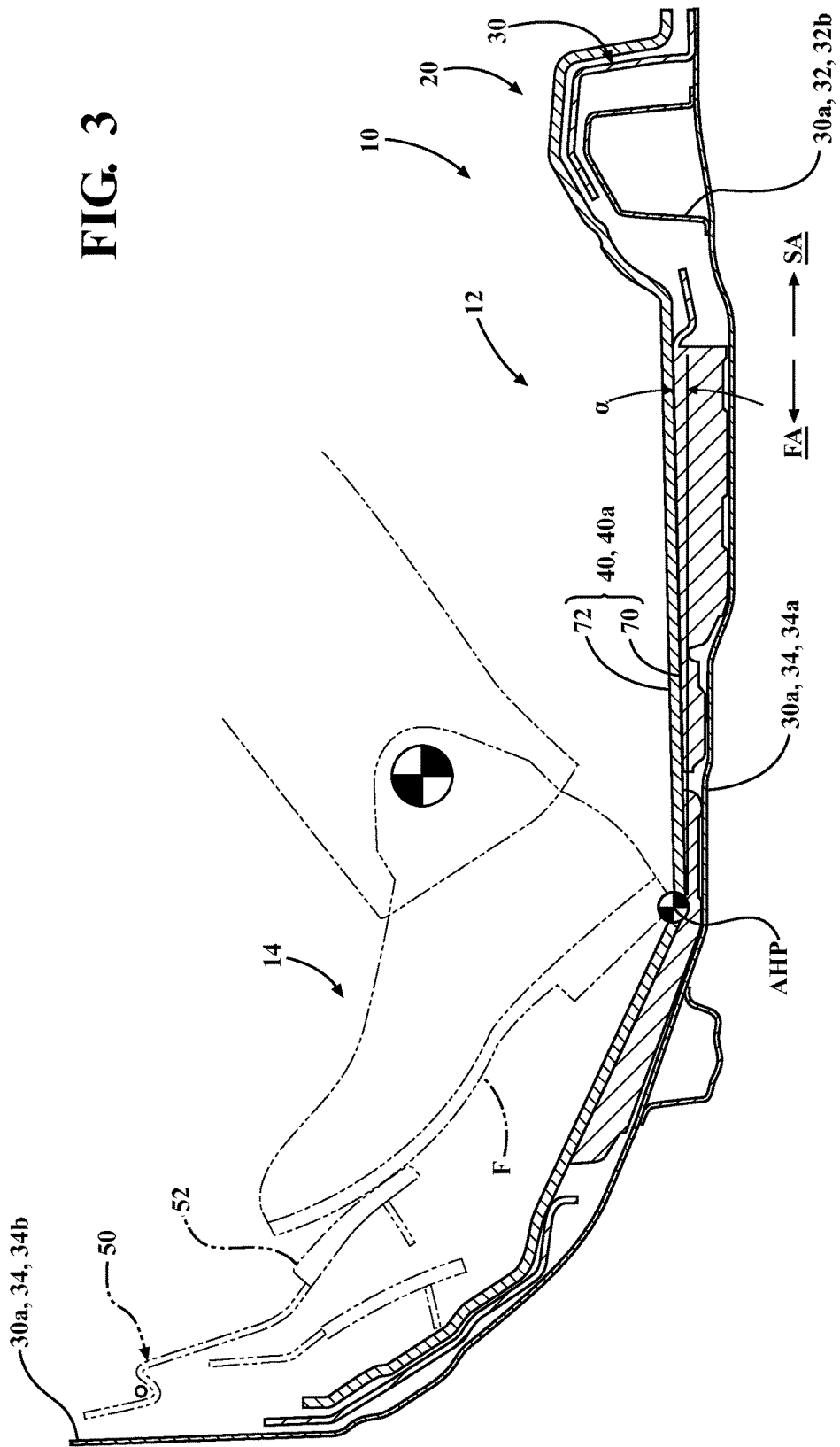
FIG. 3 is a cross sectional view of the part of the vehicle taken along the line 3-3 in FIG. 1, showing features of the floor structure and the floor covering.

As shown with additional reference to FIG. 3, the floor covering 40a has an accelerator heel point AHP for the accelerator pedal 52 of the pedal assembly 50, and the thickness of the silencer 70 is increased in the driver's side footwell area FA rearward from the accelerator heel point AHP compared to one in an otherwise similar vehicle 10. Although the increased thickness of the silencer 70 is described generally with reference to the accelerator heel point AHP, and more particularly with reference to the cross section shown in FIG. 3 in an upright longitudinally extending plane through the accelerator heel point AHP, it will be understood that this description is applicable in principle to, and representative of, the heel points for one, some or all of the accelerator pedal 52, the brake pedal 54 and the optional clutch pedal 56 of the pedal assembly 50.

The accelerator heel point AHP represents the point at which a driver that is seated in the driver's seat 62 and whose foot F is accommodated in the footwell 14 of the passenger compartment 12 will rest their heel in order to place the ball of their foot F flatly upon the accelerator pedal 52 when the accelerator pedal 52 is in its release position. As such, the accelerator heel point AHP is located forward of the driver's seat area SA of the floor 20, at its driver's side footwell area FA, rear of the portion of the driver's side footwell area FA over which the accelerator pedal 52 is positioned.

As shown, the top surface of the silencer 70 generally slopes upward from the horizontal from the accelerator heel point AHP rearward to the driver's seat area SA. Optionally, the top surface of the silencer 70 may generally continue to slope upward rearward into and beyond the driver's seat area SA. Where the bottom surface of the silencer 70 additionally generally slopes downward from the accelerator heel point AHP to the driver's seat area SA, remains horizontal from the accelerator heel point AHP to the driver's seat area SA or at least does not slope upward to a greater extent than the top surface of the silencer 70 from the accelerator heel point AHP to the driver's seat area SA, the upward slope of the top surface of the silencer 70 from the accelerator heel point AHP to the driver's seat area SA not only increases the thickness of the silencer 70 in the driver's side footwell area FA rearward from the accelerator heel point AHP to the driver's seat area SA compared to an otherwise similar vehicle 10 whose silencer 70 defines a top surface that is horizontal, but also contributes to the silencer 70 increasing in thickness from the accelerator heel point AHP rearward to the driver's seat area SA. Even if this is not the case for the bottom surface of the silencer 70, the thickness of the silencer 70 is still increased in the driver's side footwell area FA rearward from the accelerator heel point AHP to the driver's seat area SA compared to an otherwise similar vehicle 10 whose silencer 70 defines a top surface that is horizontal.

The top surface of the silencer 70 may, as shown, generally slope upward from the horizontal from the accelerator heel point AHP rearward to the driver's seat area SA at an angle α. The angle α may, for example, be approximately 1.3 degrees. In this or other examples, top surface of the silencer 70 generally slopes upward from the horizontal from the accelerator heel point AHP rearward to the driver's seat area SA in a progressive manner. Alternatively, or additionally, the top surface of the silencer 70 could slope upward from the accelerator heel point AHP rearward to the driver's seat area SA in a stepwise manner, for example.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
   a pedal; and
   a vehicle floor, the vehicle floor having a driver's side footwell area over which the pedal is positioned and a driver's seat area, and including:
   a rigid floor structure, and
   a floor covering for the floor structure, the floor covering having a heel point for the pedal at the driver's side footwell area, and including a sound attenuating silencer overlying the floor structure and carpeting overlying the silencer, the silencer's top surface sloping upward in the driver's side footwell area from the heel point to the driver's seat area.

2. The vehicle of claim 1, wherein the pedal is an accelerator pedal.

3. The vehicle of claim 1, wherein the silencer is shaped to correspond to the shape of the floor structure.

4. The vehicle of claim 1, wherein the carpeting is shaped to correspond to the shape of the floor structure.

5. The vehicle of claim 1, wherein the silencer's top surface progressively slopes upward in the driver's side footwell area from the heel point to the driver's seat area.

6. The vehicle of claim 1, wherein the silencer's top surface progressively slopes upward at an approximately 1.3 degree angle in the driver's side footwell area from the heel point to the driver's seat area.

7. The vehicle of claim 1, wherein the silencer increases in cross sectional thickness in the driver's side footwell area from the heel point to the driver's seat area as a product of its top surface sloping upward in the driver's side footwell area from the heel point to the driver's seat area.

8. A vehicle, comprising:
   a pedal; and
   a vehicle floor, the vehicle floor having a driver's side footwell area over which the pedal is positioned and a driver's seat area, and including:
   a rigid floor structure, and
   a floor covering for the floor structure, the floor covering having a heel point for the pedal at the driver's side footwell area, and including a sound attenuating silencer overlying the floor structure and carpeting overlying the silencer, the silencer increasing in cross sectional thickness in the driver's side footwell area from the heel point to the driver's seat area.

9. The vehicle of claim 8, wherein the pedal is an accelerator pedal.

10. The vehicle of claim 8, wherein the silencer is shaped to correspond to the shape of the floor structure.

11. The vehicle of claim 8, wherein the carpeting is shaped to correspond to the shape of the floor structure.

12. The vehicle of claim 8, wherein the silencer progressively increases in cross sectional thickness in the driver's side footwell area from the heel point to the driver's seat area.

13. The vehicle of claim 8, wherein the silencer's top surface slopes upward in the driver's side footwell area from the heel point to the driver's seat area to contribute to the silencer increasing in cross sectional thickness in the driver's side footwell area from the heel point to the driver's seat area.

14. The vehicle of claim 13, wherein the silencer's top surface progressively slopes upward in the driver's side footwell area from the heel point to the driver's seat area.

15. The vehicle of claim 13, wherein the silencer's top surface progressively slopes upward at an approximately 1.3 degree angle in the driver's side footwell area from the heel point to the driver's seat area.

16. A vehicle, comprising:
    a pedal; and
    a vehicle floor, the vehicle floor having a driver's side footwell area over which the pedal is positioned and a driver's seat area, and including:
    a rigid floor structure, and
    a floor covering for the floor structure, the floor covering having a heel point for the pedal at the driver's side footwell area, and including a compressible but uncompressed sound attenuating silencer resting on the floor structure and carpeting resting on the silencer, the silencer's top surface progressively sloping upward at an approximately 1.3 degree angle in the driver's side footwell area from the heel point to the driver's seat area, with the silencer increasing in cross sectional thickness in the driver's side footwell area from the heel point to the driver's seat area as a product of its top surface sloping upward in the driver's side footwell area from the heel point to the driver's seat area.

17. The vehicle of claim 16, wherein the pedal is an accelerator pedal.

18. The vehicle of claim 16, wherein the silencer is shaped to correspond to the shape of the floor structure.

19. The vehicle of claim 16, wherein the carpeting is shaped to correspond to the shape of the floor structure.

* * * * *